US011370319B2

(12) United States Patent
Treadway et al.

(10) Patent No.: US 11,370,319 B2
(45) Date of Patent: Jun. 28, 2022

(54) ELECTRIC SCOOTER WITH TOP-SWAPPABLE BATTERY

(71) Applicant: Acton, Inc., Livermore, CA (US)

(72) Inventors: Peter Treadway, Pleasanton, CA (US); Janelle Wang Treadway, Pleasanton, CA (US); Anthony Goyeneche, Fremont, CA (US)

(73) Assignee: Acton, Inc., Livermore, CA (US)

( * ) Notice: Subject to any disclaimer, the term of this patent is extended or adjusted under 35 U.S.C. 154(b) by 391 days.

(21) Appl. No.: 16/569,151

(22) Filed: Sep. 12, 2019

(65) Prior Publication Data

US 2020/0398694 A1    Dec. 24, 2020

Related U.S. Application Data

(60) Provisional application No. 62/864,927, filed on Jun. 21, 2019.

(51) Int. Cl.
| | |
|---|---|
| *B60L 53/80* | (2019.01) |
| *B62K 3/00* | (2006.01) |
| *B60L 50/64* | (2019.01) |
| *B62J 43/16* | (2020.01) |
| *B62J 43/28* | (2020.01) |
| *B62K 11/10* | (2006.01) |
| *H01M 50/20* | (2021.01) |
| *B62J 43/26* | (2020.01) |
| *B62K 11/14* | (2006.01) |
| *B62J 43/00* | (2020.01) |

(52) U.S. Cl.
CPC ............... *B60L 53/80* (2019.02); *B60L 50/64* (2019.02); *B62J 43/16* (2020.02); *B62J 43/26* (2020.02); *B62J 43/28* (2020.02); *B62K 3/002* (2013.01); *B62K 11/10* (2013.01); *H01M 50/20* (2021.01); *B60L 2200/20* (2013.01); *B62J 43/00* (2020.02); *B62K 11/14* (2013.01); *B62K 2202/00* (2013.01); *B62K 2204/00* (2013.01); *H01M 2220/20* (2013.01)

(58) Field of Classification Search
USPC .......................................................... 180/220
See application file for complete search history.

(56) References Cited

U.S. PATENT DOCUMENTS

| | | | |
|---|---|---|---|
| 6,199,880 B1 * | 3/2001 | Favorito | A63C 17/012 280/87.042 |
| 6,520,516 B2 * | 2/2003 | Favorito | A63C 17/01 280/87.042 |
| 6,619,679 B2 * | 9/2003 | Lan | B62K 3/002 280/87.05 |
| 9,943,749 B2 * | 4/2018 | Cerboneschi | A63C 17/01 |

(Continued)

FOREIGN PATENT DOCUMENTS

| | | | | |
|---|---|---|---|---|
| CN | 110203318 A * | 9/2019 | | B62K 3/002 |
| DE | 102019007915 B4 * | 6/2021 | | B62K 3/002 |
| DE | 202021104432 U1 * | 9/2021 | | B62J 43/20 |

*Primary Examiner* — Minnah L Seoh
*Assistant Examiner* — Hosam Shabara
(74) *Attorney, Agent, or Firm* — Paul Davis (57) ABSTRACT

Provided is an electric scooter with a top-swappable battery. In some embodiments, the electric scooter a frame having an opening, and a removable deck assembly disposed in the opening, the removable deck assembly comprising a deck having an upper surface and a lower surface, and a battery pack attached to the lower surface of the deck.

14 Claims, 13 Drawing Sheets (56) References Cited

U.S. PATENT DOCUMENTS

| | | | | |
|---|---|---|---|---|
| 10,351,017 B1* | 7/2019 | Chen | .................. | B60L 50/66 |
| 10,384,740 B1* | 8/2019 | Cheng | .................. | B60K 1/04 |
| 11,038,235 B2* | 6/2021 | Ye | .................. | B62M 6/90 |
| 2014/0332297 A1* | 11/2014 | Palacio | .................. | A63C 17/12 |
| | | | | 180/181 |
| 2016/0256767 A1* | 9/2016 | Cerboneschi | .................. | A63C 17/017 |
| 2021/0265607 A1* | 8/2021 | Bosscher | .................. | B62M 6/90 |

\* cited by examiner

ELECTRIC SCOOTER WITH TOP-SWAPPABLE BATTERY

CROSS REFERENCE TO RELATED APPLICATIONS

The present application claims priority to U.S. Provisional Patent Application No. 62/864,927, filed Jun. 21, 2019, entitled "ELECTRIC SCOOTER WITH TOP-SWAPPABLE BATTERY," the disclosure thereof incorporated by reference herein in its entirety.

TECHNICAL FIELD

This disclosure relates to generally to electric scooters, and more specifically to removable batteries for such scooters.

BACKGROUND

Electric scooters are subject to demanding environmental conditions, including rain, puddles of water, and microvibrations. For sharable scooters these conditions are multiplied, as the scooters are frequently in use, and are normally left outdoors for easy accessibility by users. These demands extend to the battery, and it's physical and electrical connections to the scooter.

SUMMARY

In general, one aspect disclosed features an electric scooter, comprising: a frame having an opening; and a removable deck assembly disposed in the opening, the removable deck assembly comprising: a deck having an upper surface and a lower surface, and a battery pack attached to the lower surface of the deck.

Embodiments of the electric scooter may include one or more of the following features. In some embodiments, the frame has an upper surface; and the removable deck assembly is configured to be lifted out of the opening of the frame from above the upper surface of the frame, and is configured to be lowered into the opening of the frame from above the upper surface of the frame. Some embodiments comprise an electric motor; and a first electrical connector, wherein the first electrical connector is electrically coupled to the electric motor; wherein the removable deck assembly comprises a second electrical connector, wherein the second electrical connector is electrically coupled to the battery pack; and wherein when joined together, the first and second electrical connectors electrically couple the electric motor and the battery pack. Some embodiments comprise a first flexible electrical cable electrically coupled to the first electrical connector, and electrically coupled to the electric motor; and a second flexible electrical cable electrically coupled to the second electrical connector, and electrically coupled to the battery pack. In some embodiments, the first and second electrical connectors are configured to retain each other, or release each other, by twisting the first and second electrical connectors in opposite directions. In some embodiments, the first and second electrical connectors become electrically coupled when the removable deck assembly is lowered into the opening of the frame. Some embodiments comprise at least one elastic mounting block disposed between the removable deck assembly and the frame, wherein at least one of the first and second electrical connectors is disposed within the at least one elastic mounting block. Some embodiments comprise a latch configured to secure the removable deck assembly within the opening of the frame when the latch is in a closed position, and configured to release the removable deck assembly from the opening of the frame when the latch is in an open position. Some embodiments comprise a lock operable to fix the latch in at least one of the open position and the closed position.

In general, one aspect disclosed features an electric scooter, comprising: a frame; a plurality of wheels coupled to the frame; an electric motor coupled to at least one of the wheels; wherein the frame comprises an opening configured to receive a removable deck assembly, wherein the removable deck assembly comprises: a deck having an upper surface and a lower surface, and a battery pack attached to the lower surface of the deck.

Embodiments of the electric scooter may include one or more of the following features. In some embodiments, the frame has an upper surface; and the opening in the frame is configured to receive the removable deck assembly when the removable deck assembly is lowered into the opening of the frame from above the upper surface of the frame. Some embodiments comprise a first electrical connector, wherein the first electrical connector is electrically coupled to the electric motor, and wherein first electrical connector is configured to electrically couple with a second electrical connector of the removable deck assembly. In some embodiments, the first and second electrical connectors are configured to retain each other, or release each other, by twisting the first and second electrical connectors in opposite directions. In some embodiments, the first and second electrical connectors become electrically coupled when the removable deck assembly is lowered into the opening of the frame. Some embodiments comprise a latch configured to secure the removable deck assembly within the opening of the frame when the latch is in a closed position, and configured to release the removable deck assembly from the opening of the frame when the latch is in an open position.

In general, one aspect disclosed features a removable deck assembly for an electric scooter, the removable deck assembly comprising: a deck having an upper surface and a lower surface; and a battery pack attached to the lower surface of the deck.

Embodiments of the removable deck assembly may include one or more of the following features. In some embodiments, the removable deck assembly is configured to be lowered into an opening of a frame of the electric scooter from above an upper surface of the frame. Some embodiments comprise a first electrical connector, wherein the first electrical connector is electrically coupled to the battery pack, and wherein first electrical connector is configured to electrically couple with a second electrical connector of the electric scooter. In some embodiments, the first and second electrical connectors are configured to retain each other, or release each other, by twisting the first and second electrical connectors in opposite directions. In some embodiments, the first and second electrical connectors become electrically coupled when the removable deck assembly is lowered into an opening of the frame of the electric scooter.

DETAILED DESCRIPTION

Embodiments of the described technology provide electric scooters having top-swappable batteries. The batteries may be attached to the underside of the deck of the scooter to form a removable deck assembly. The deck assembly may be removed from the top of the scooter by operating a latch and lifting a handle of the assembly. The deck assembly may be returned to the scooter in a similar manner.

In some embodiments, the battery may be electrically coupled to a motor of the scooter by electrical cables and a electrical connector. The electrical connector may be a quick twist connector that is opened and closed by twisting its halves in opposite directions.

In some embodiments, instead of using electrical cables, the scooter and deck assembly may include electrical connectors that mate when the deck assembly is installed in the scooter. The electrical connectors may be surrounded by cushions that protect the connectors from microvibrations, dirt and water, and the like.

Figure 1:
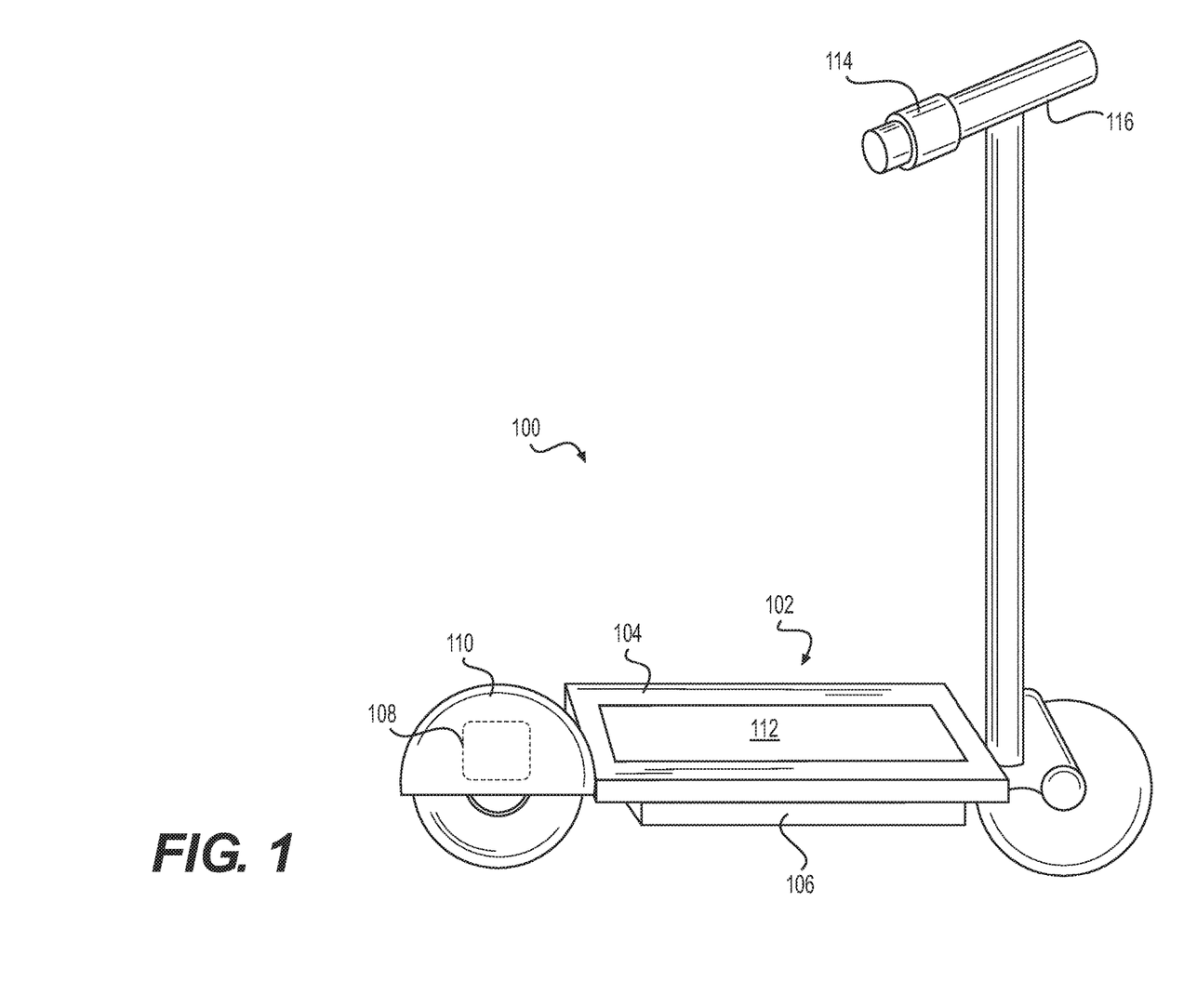
FIG. 1 illustrates an electric scooter according to embodiments of the disclosed technology.

FIG. 1 illustrates an electric scooter 100 according to embodiments of the disclosed technology. Referring to FIG. 1, the scooter 100 includes a deck assembly 102 removably attached to a frame 104 of the scooter 100. The deck assembly 102 includes a battery case 106 mounted underneath a deck 112. The battery case 106 includes one or more batteries (not shown). The batteries are electrically coupled to an electric drive motor 108, which is protected by a housing 110. The scooter 100 may be steered by turning a handlebar 116. The speed of the motor 108 may be controlled using a throttle 114 mounted on the handlebar 116.

The electric scooter 100 is depicted in FIG. 1 as having only two wheels. However, it will be appreciated that the disclosed technology applies to scooters having any number of wheels. Furthermore, it will be appreciated that the disclosed technology applies to vehicles other than scooters, and having any number of wheels.

Figure 2:
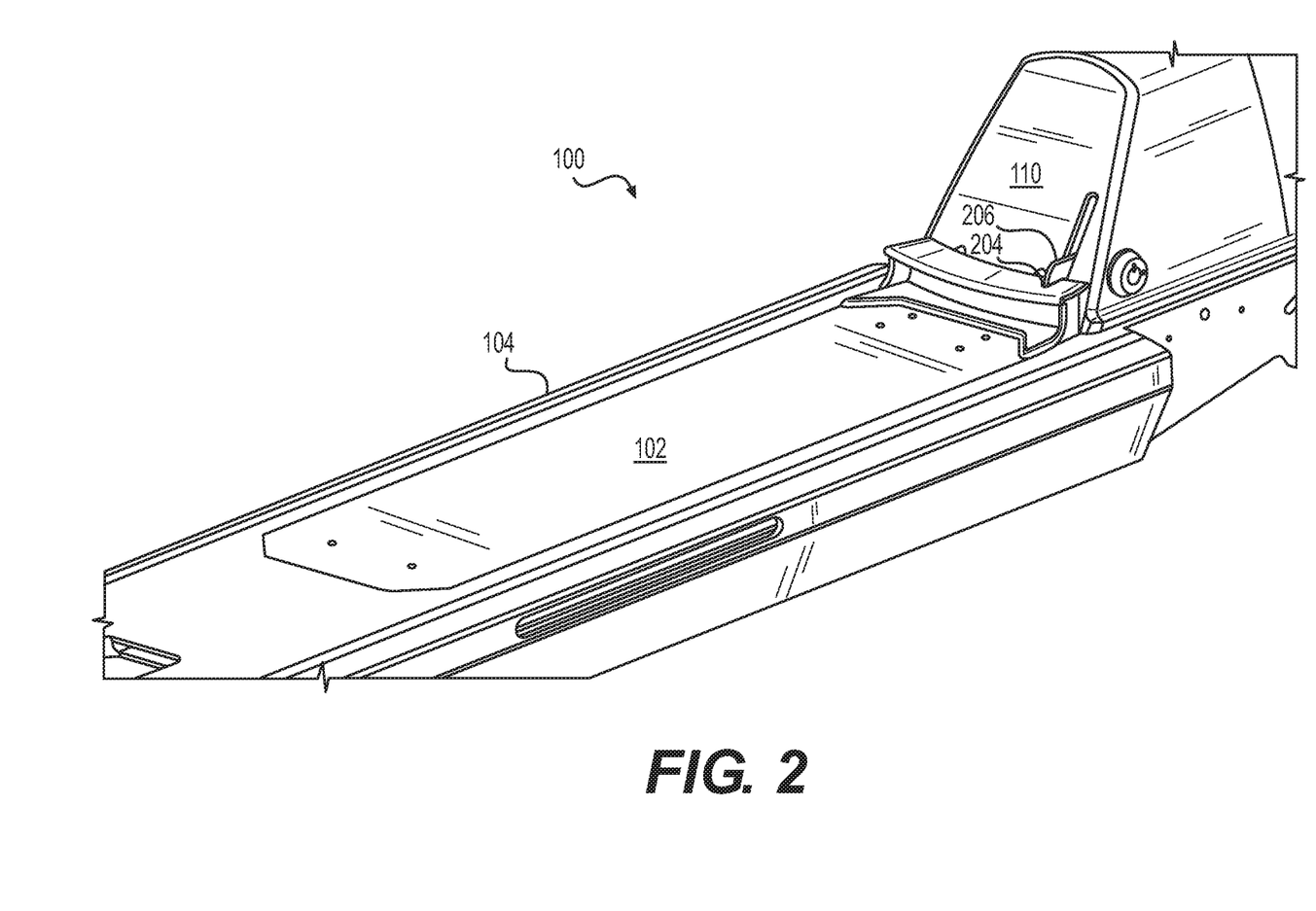
FIG. 2 illustrates further detail of the electric scooter of FIG. 1.

FIG. 2 illustrates further detail of the electric scooter 100 of FIG. 1. Referring to FIG. 2, the removable deck assembly 102 is held flush with the frame 104 by a latch 206 when engaged in a notch 204. The latch 206 may be controlled by a latch mechanism (not shown) disposed within the housing 110.

Figure 3:
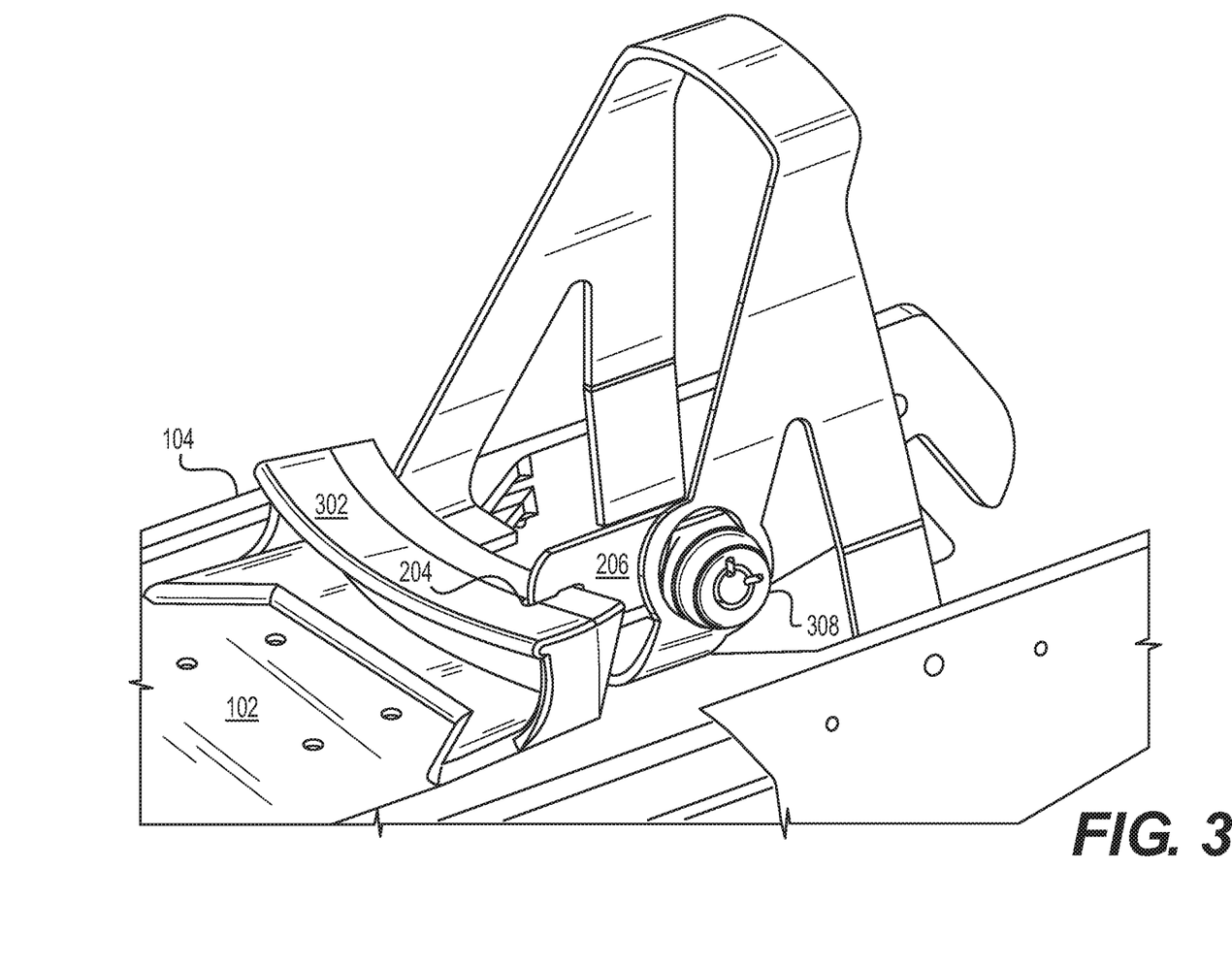
FIG. 3 illustrates further detail of the deck assembly and latch of FIGS. 1 and 2.

FIG. 3 illustrates further detail of the deck assembly 102 and latch 206 of FIGS. 1 and 2. Referring to FIG. 3, the deck assembly 102 may include a handle 302 to assist with the removal and installation of the deck assembly 102. The handle 302 may include a notch 204 to receive the latch 206. The deck assembly 102 may include a lock 308. The lock 308 may be operable to fix the latch 206 in an open position and/or a closed position, where the latch 206 secures the deck assembly 102 within the frame 104 when in the closed position. A key (not shown) may be inserted within lock assembly 308 to rotate the latch into, and out of, the notch 204, that is, between the closed position and an open position. When engaged with the notch 204, the latch retains the deck assembly 102 within the frame 104 of the scooter 100.

In the depicted embodiment, the lock assembly 308 is implemented as a physical lock, to be used with a physical key. But in other embodiments, the lock assembly 308 may be implemented in other ways. For example, the lock assembly 308 may be an electronic lock, which may be operated using an electronic key, fob, remote control, or the like. In embodiments where security is not required, the lock in the lock assembly 308 may be replaced with a knob, a button, or another mechanism. In any case, the lock assembly 308 may be hidden or disguised. This feature is especially useful in a ridesharing fleet, where users should not operate the lock assembly 308, or remove the deck assembly 102.

Figure 4:
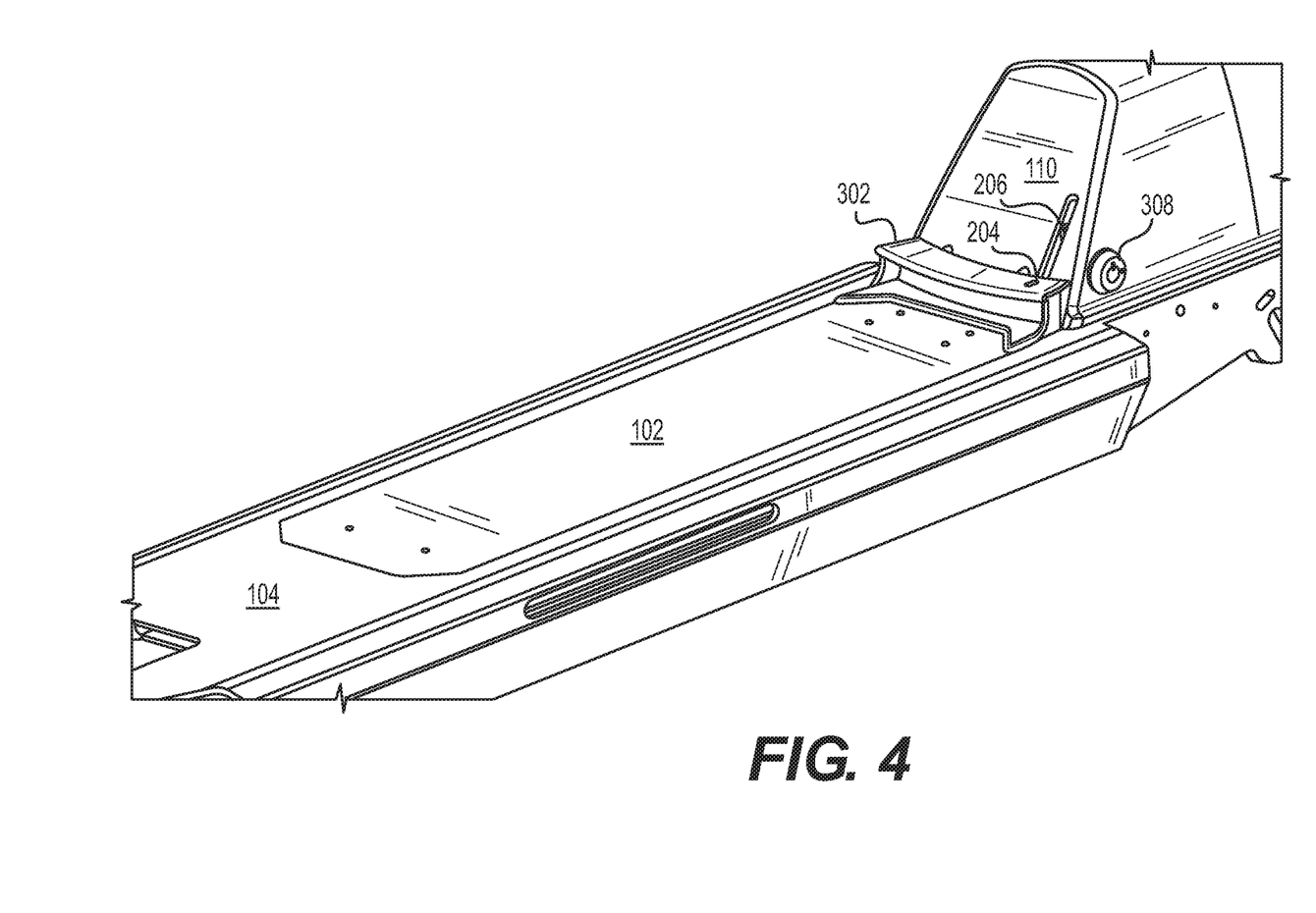
FIG. 4 illustrates detail of the scooter of FIGS. 1 and 2 with the latch in an open position.

FIG. 4 illustrates detail of the scooter 100 of FIGS. 1 and 2 with the latch 206 in an open position. Referring to FIG. 4, the lock assembly 308 has been operated to rotate the latch 206 out of the notch 204. To protect the user from the latch, the latch 206 has been rotated to a position within the housing 110. The deck assembly 102 may now be removed from the scooter 100.

Figure 5:
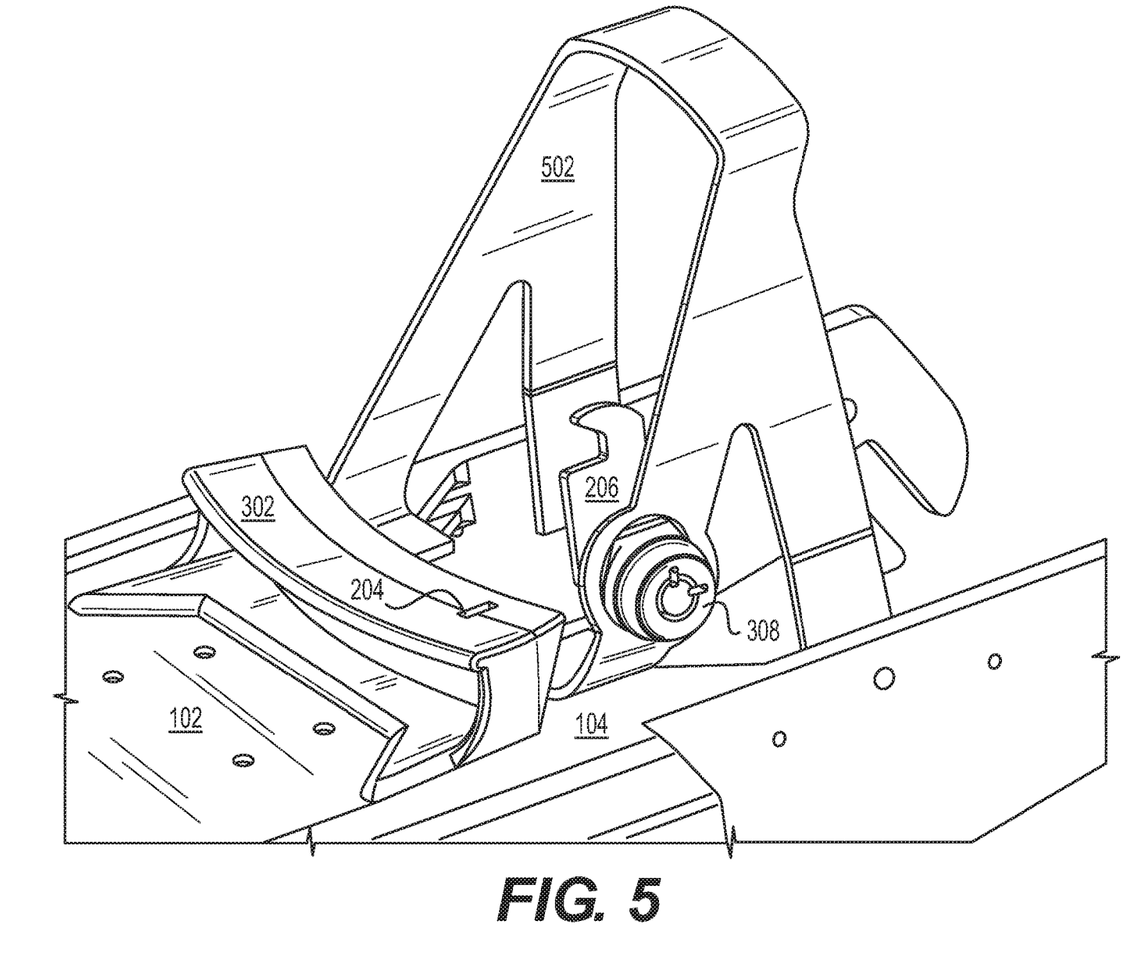
FIG. 5 illustrates further detail of the scooter of FIGS. 1 and 2 with the latch in an open position.

FIG. 5 illustrates further detail of the scooter 100 of FIGS. 1 and 2 with the latch 206 in an open position, and with the housing 110 removed. Referring to FIG. 5, the latch 206, and the lock assembly 308, are held in place by a strut 502 that is connected to the frame 104.

Figure 6:
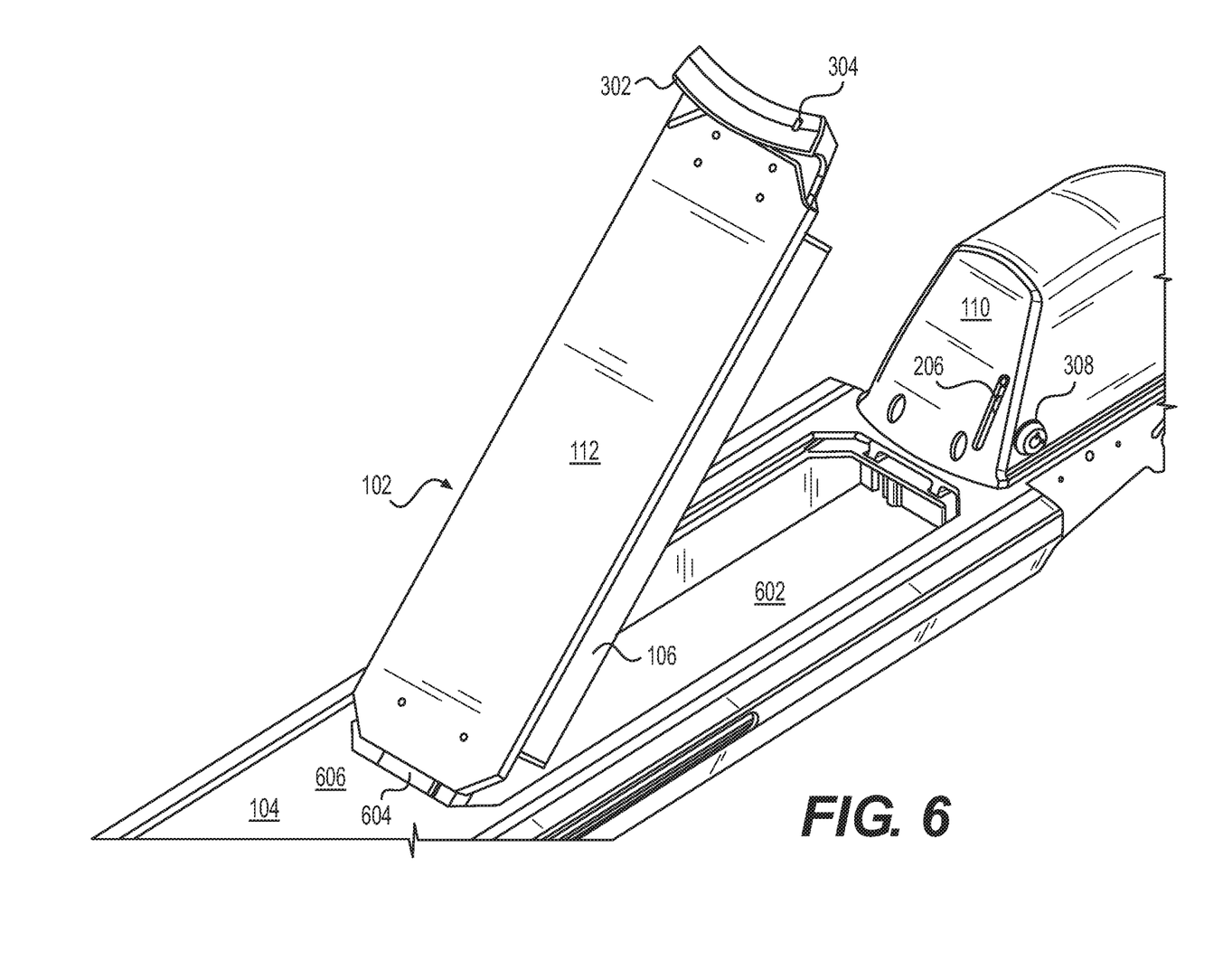
FIG. 6 illustrates detail of the scooter of FIGS. 1 and 2 with the latch in an open position.

FIG. 6 illustrates detail of the scooter 100 of FIGS. 1 and 2 during installation, or removal, of the deck assembly 102. Referring to FIG. 6, the frame 104 has an upper surface 606, and an opening 602 in the frame 104 is visible. The opening 602 is formed so as to receive the deck assembly 102 when the deck assembly 102 is lowered into the opening of the frame from above the upper surface 606 of the frame. As can be seen in FIG. 6, the deck assembly 102 includes a protruding tongue 604 at the front of the deck assembly 102. During removal of the deck assembly 102, a user may lift the deck assembly 102 out of the opening of the frame 104 from above the upper surface 606 of the frame 104 by pivoting the deck assembly 102 upward about the tongue 604 using the handle 302, and then slide the deck assembly 102 slightly to the rear of the scooter 100 to disengage the tongue 604 from the frame 104. During installation of the deck assembly 102, a user may first insert the tongue 604 into the frame 104, pivot the deck assembly 102 downward into the opening 602 until flush with the frame 104, and then rotate the latch 206 into the notch 204 to secure the deck assembly 102 within the frame 104.

Also visible in FIG. 6 is the battery case 106. The battery case 106 may include one or more batteries (not shown), which may be cushioned with foam pads or similar materials. The battery case 106 may be integrated with the deck 112 to form the deck assembly 102, as noted above. The deck assembly 102 may be watertight to prevent damage to the batteries, and may be of automotive quality. This arrangement provides several advantages. In current designs, the battery case is mounted underneath a non-removable deck, for example using screws. In such designs, the batteries can only be removed by inverting the scooter, and unscrewing the battery case. During this process, the scooter may be damaged, the battery case may be damaged, and the screws may be lost. Furthermore, the user must have a tool such as a screwdriver. In contrast, in the described embodiments, the batteries may be removed without tools, by simply operating the latch 206 and lifting out the deck assembly 102. No tools are required. The scooter need not be inverted, and may remain on the ground, in a rack, or the like.

Other advantages are especially applicable to a fleet of shareable electric scooters. In current fleets, the scooters are generally collected each evening, and taken to a charging facility where the batteries are charged. The charged scooters are then returned to scooter sharing locations the next morning. But in this arrangement, the scooters are unavailable for sharing while being charged. And this arrangement requires two trips per day: one trip to collect the scooters, and another trip to deploy them.

Embodiments of the disclosed technology solve both of these problems. With the disclosed removable deck assembly, the scooters need not be collected. Instead, only the deck assemblies may be collected. The scooters may be left in the sharing location, sharing racks, and the like. Furthermore, with a fleet of similar scooters, the deck assemblies are interchangeable. Therefore, an operator can replace a discharged battery pack with a fresh battery pack, requiring only one trip, and keeping the scooter available while the discharged battery pack is recharged. And because the disclosed deck assemblies are much smaller than the scooters, many more scooters can be serviced by a single truck than with current arrangements. In addition, because the disclosed deck assemblies weigh less than the scooter, there is less likelihood an operator will be injured while lifting them.

Figure 7:
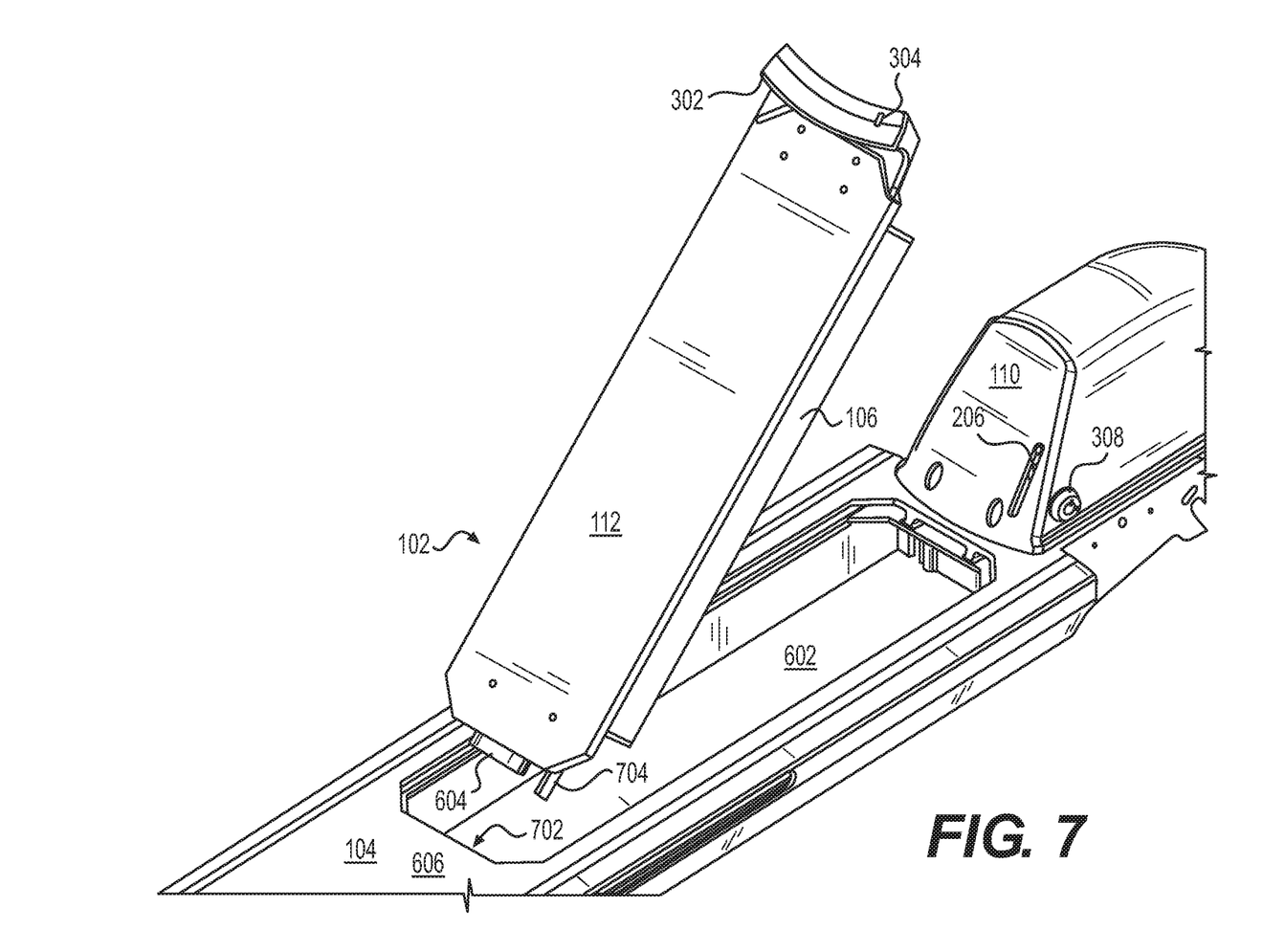
FIG. 7 illustrates further detail of the scooter of FIGS. 1 and 2 during installation, or removal, of the deck assembly.

FIG. 7 illustrates further details of the scooter 100 of FIGS. 1 and 2 during installation, or removal, of the deck assembly 102. Referring to FIG. 7, the tongue 604 of the deck assembly 102 is free of the frame 104. As can be seen in FIG. 7, the frame 104 may feature a double-wall construction for rigidity and light weight. In the disclosed embodiment, a slot 702 may be formed between the walls of the frame 104 to receive the tongue 604. Also visible in the embodiment of FIG. 7 is a portion of an electrical power cable 704. The power cable 704 may provide power to the motor 108 of the scooter 100. To separate the deck assembly 102 from the scooter 100, the user may operate a connector of the power cable 704, as described in detail below.

Figure 8:
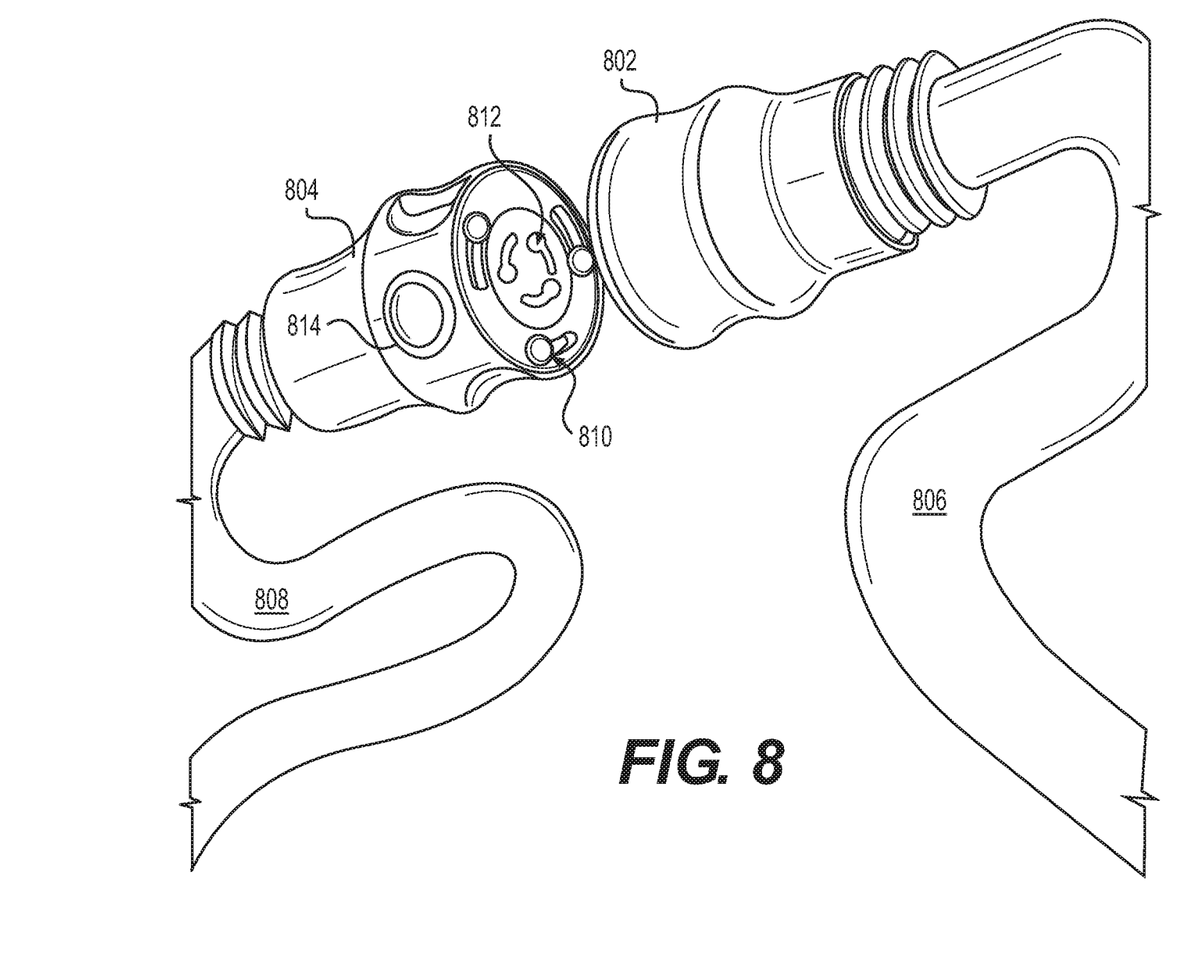
FIG. 8 illustrates a quick twist electrical soft connector according to embodiments of the disclosed technology.

FIG. 8 illustrates a quick twist electrical soft connector according to embodiments of the disclosed technology. As used herein, the term "soft connector" is used to refer to a connector having two halves, where at least one of the halves is coupled to a flexible electrical cable. In some embodiments, the term "soft connector" is used to refer to a connector where both halves of the connector are coupled to respective flexible electrical cables. As described below, the flexible cable(s) serve to insulate the scooter from microvibrations, a problem unique to vehicles such as scooters that have small, hard wheels. Referring to FIG. 8, the soft electrical connector includes a male half 802 and a female half 804. The halves 802, 804 are formed at the ends of electrical cables 806, 808, respectively. The illustrated soft connector is a quick twist connector that is opened and closed by twisting its halves 802, 804 in opposite directions. Accordingly, the female half 804 of the soft connector includes a plurality of curved slots 810, each including a round opening to receive a respective locking pin (not shown) of the male half 802. The electrical connectors may be implemented in a similar manner, as shown at 812.

In some embodiments, one half of the soft connector may include a locking indicator 814. The locking indicator 814 may shine red until the soft connector is completely closed, whereupon the indicator 814 may switch to green to indicate a positive lock of the soft connector.

One advantage of the disclosed quick twist electrical soft connector is that it mitigates the problem of microvibrations. Vehicles such as automobiles and bicycles are subject to vibrations caused by imperfections in the road surface. Vehicles with small, hard wheels, such scooters, are subject to these vibrations, and also to microvibrations, which are caused by tiny imperfections in the road surface, for example such as the pebbles in a conglomerate road surface. Electrical connectors in particular are adversely affected by microvibrations, which cause the mating electrical parts to rub together and thereby deteriorate. Gold plating on electrical connectors is particularly subject to this deterioration. In the disclosed embodiments, the lengths of electrical cables 806, 808 isolate the electrical connector from these microvibrations, greatly reducing any wear the electrical connectors 812 experience.

Another advantage of the disclosed quick twist electrical soft connector is that it encourages users not to pull on the cables 806, 808 to open the soft connector. In conventional electrical connectors with no twist lock mechanism, users may be tempted to pull on the cables to open the connector. This abuse may shorten the life of the electrical cable and electrical connector considerably. But this is not possible with the twist connector. The user must grasp the soft connector halves in order to twist them in opposite directions. Consequently, the electrical soft connector and electrical cables 806, 808 may enjoy a longer lifespan.

Figure 9:
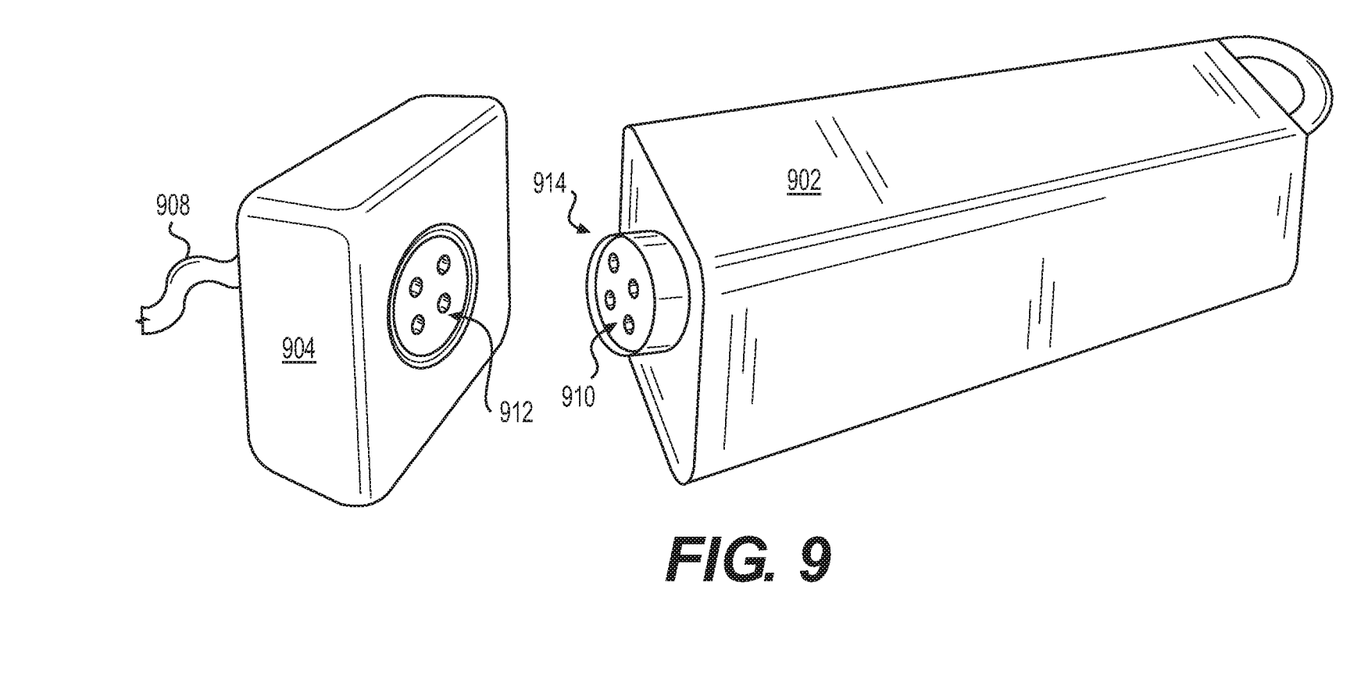
FIG. 9 illustrates a cushioned electrical connector according to embodiments of the disclosed technology.

FIG. 9 illustrates a cushioned electrical connector according to embodiments of the disclosed technology. Referring to FIG. 9, a deck assembly 902 that includes a battery pack may be pressed against an elastic mounting block 904 during installation. The deck assembly 902, and the mounting block 904, include respective electrical connectors 910, 912 that are mated during installation of the deck assembly 902, thereby providing power from the battery pack to the motor through an electrical power cable 908. The mounting block 904 may be fabricated of an elastic material such as rubber to cushion the electrical connectors 910, 912 from microvibrations. In the embodiment of FIG. 9, the elastic mounting block 904 is disposed upon the scooter. But in other embodiments, a elastic mounting block may be disposed on the deck assembly 902 instead, or as well. For example, as shown in FIG. 9, the deck assembly 902 may include a second elastic mounting block 914 to further isolate the electrical connectors 910, 912 from microvibrations. These elastic mounting blocks 904, 914 may also form a seal about the electrical connectors 910, 912 that protects the electrical connectors 910, 912 from water, dirt, and the like.

Figure 10:
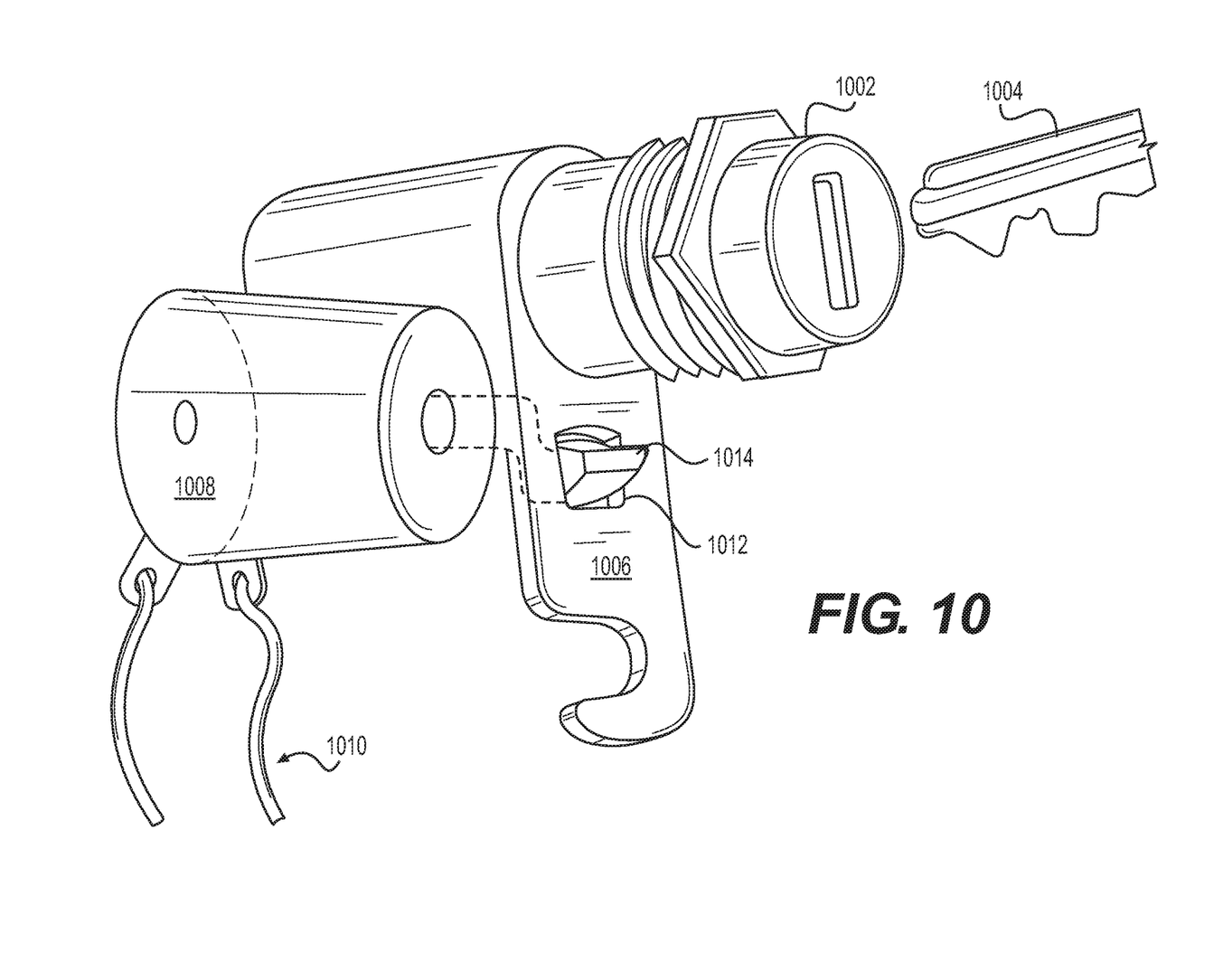
FIG. 10 illustrates a compound locking assembly according to embodiments of the disclosed technology.

FIG. 10 illustrates a compound locking assembly according to embodiments of the disclosed technology. Referring to FIG. 10, the compound locking assembly includes a mechanical lock 1002, which may be operated by a physical key 1004 to rotate a latch 1006 into a corresponding notch, such as notch 204 in handle 302 of deck assembly 102, as shown in FIG. 3.

Referring again to FIG. 10, the compound locking assembly may also include an electric lock 1008, which may receive power through electrical cables 1010, and which may be operated using an electronic key, fob, remote control, or the like. When operated, the electric lock 1008 may insert a tab 1014 into an opening 1012 formed in the latch 1006 of the mechanical lock 1002, thereby preventing operation of the mechanical lock 1002.

In some embodiments, the electric lock 1008 may operate in parallel with the mechanical lock 1002. In such embodiments, the electric lock 1008 may insert the tab 1014 into a notch in the deck assembly. In such embodiments, both locks 1002, 1008 must be opened to release the deck assembly.

In some embodiments, the tab 1014 of the electrical lock 1008 may have multiple stops. In one of the stops, the tab 1014 engages the latch 1006 of the mechanical lock 1002, thereby preventing its operation, as illustrated in FIG. 10. In another of the stops, the tab 1014 engages a notch in the deck, thereby preventing its removal, as described above. In still another one of the stops, the tab 1014 engages neither the latch 1006 nor the deck assembly, thereby permitting operation of the mechanical lock 1002, and removal of the deck assembly.

Figure 11A:
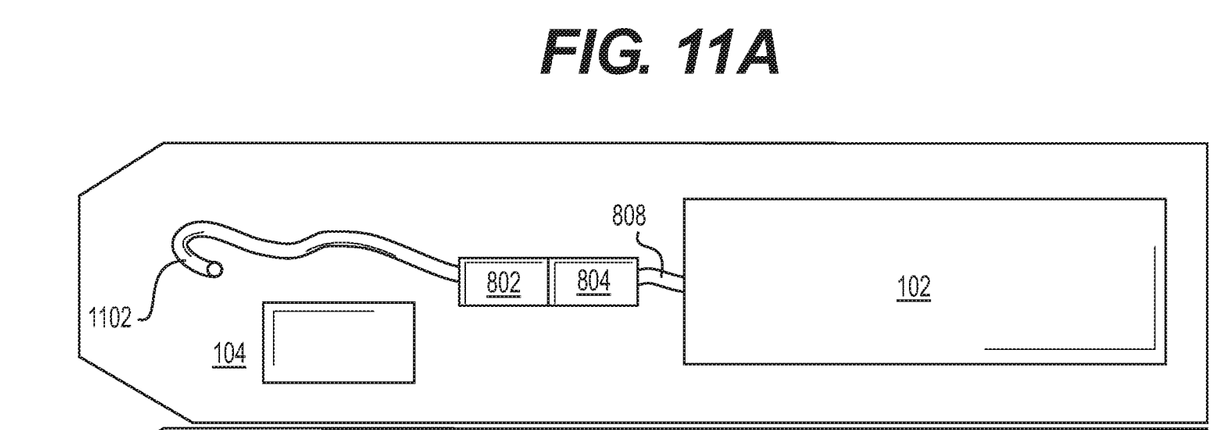
FIG. 11A illustrates a portion of the scooter during removal or installation of the deck assembly.
Figure 11B:
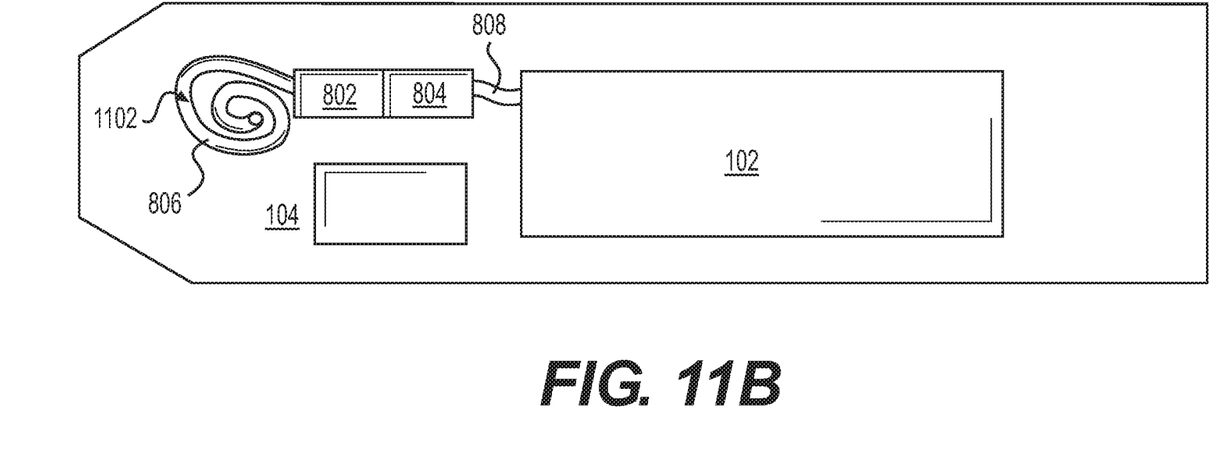
FIG. 11B illustrates a the retention device for the loose portions of the electrical cables of the scooter.

In embodiments that include an electrical power cable, the scooter may include a mechanism to retain and protect the cable when the deck assembly is installed. FIGS. 11A, B illustrate one such mechanism according to embodiments of the disclosed technology. In FIGS. 11A, B the mechanism is illustrated for the electrical cables 806, 808 and electrical connector 802, 804 of FIG. 8. However, the mechanism may be employed with any electrical cable and electrical connectors.

FIGS. 11A, B are top views of the scooter, with the rear of the scooter at the left. FIG. 11A illustrates a portion of the scooter 100 during removal or installation of the deck assembly 102. The battery pack in the deck assembly 102 is electrically coupled to the motor 108 by the electrical cables 806, 808 and the electrical connectors 802, 804. As shown in FIG. 11A, during installation or removal of the deck assembly 102, one or both of the electrical cables 806, 808 are extended to facilitate installation and removal, and to provide easy access to the electrical connectors 802, 804. A retention device 1102 permits this extension of the electrical cables 806, 808.

When the deck assembly 102 is installed in the frame 104 of the scooter 100, the retention device 1102 retracts, guides, organizes, and stores the loose portions of the electrical cables 806, 808, as shown in FIG. 11B. For example, the electrical cables 806, 808 may be retracted into a channel (not shown) formed in the frame 104 of the scooter 100. The retention device 1102 may be implemented as a spring loaded device, for example such as a winding mechanism or the like. The winding mechanism may be similar to that used in spring-loaded tape measures, with the electrical cables 806, 808 taking the place of the tape. One benefit of this mechanism is that a technician working on the scooter does not have to manually feed back the slack in the electrical cables 806, 808, that results from the removal of the battery pack. When retracted, the electrical cables 806, 808, and the electrical connectors 802, 804, are protected from pinching, wear, and the like.

Figure 12:
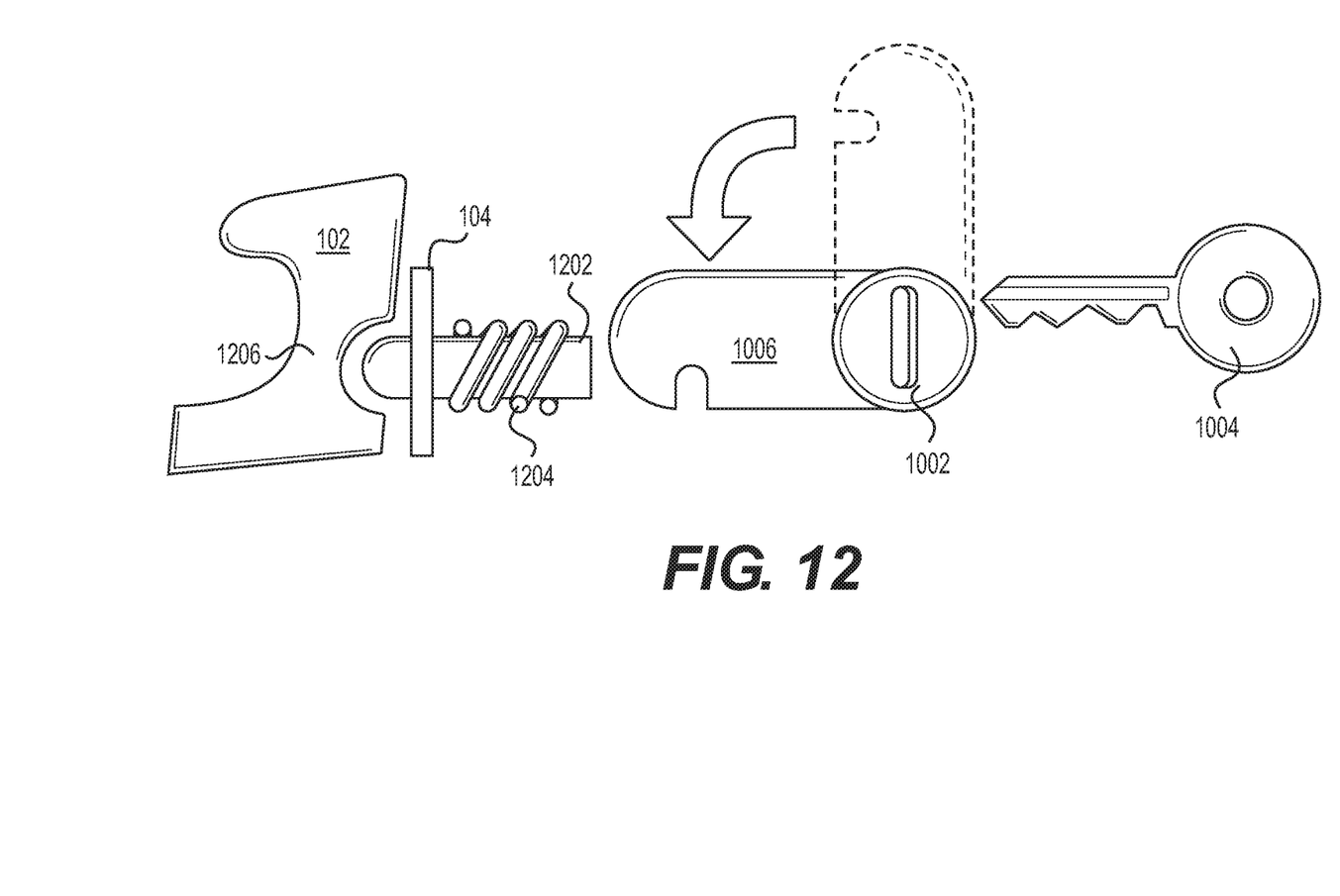
FIG. 12 illustrates a hidden latch mechanism for the scooter.

In some embodiments, the latch that retains the deck assembly 102 within the frame 104 of the scooter 100 may be hidden within a structure such as the frame 104 or the housing 110 of the scooter 100 so that it cannot be seen, and to protect the latch from damage. One such embodiment is illustrated in FIG. 12. The embodiment of FIG. 12 is illustrated for the mechanical lock 1002, physical key 1004, and latch 1006 of FIG. 10. However, the described embodiment may be employed with any lock, key, and latch, or with a keyless latch where the lock and key are replaced by a knob or the like.

Referring to FIG. 12, the described embodiment also includes a pin 1202 and a spring 1204 that biases the pin 1202 against the frame 104. When the lock 1002 and key 1004 are used to rotate the latch 1006 downward into a locked position, the latch 1006 forces the pin 1202 through a hole in the frame 104 into a notch 1206 formed in the deck assembly 102, thereby retaining the deck assembly 102 within the frame 104. When the lock 1002 and key 1004 are used to rotate the latch 1006 upward into an unlocked position, the spring 1204 backs the pin 1202 out of the notch 1206 so the deck assembly may be removed.

Figure 13:
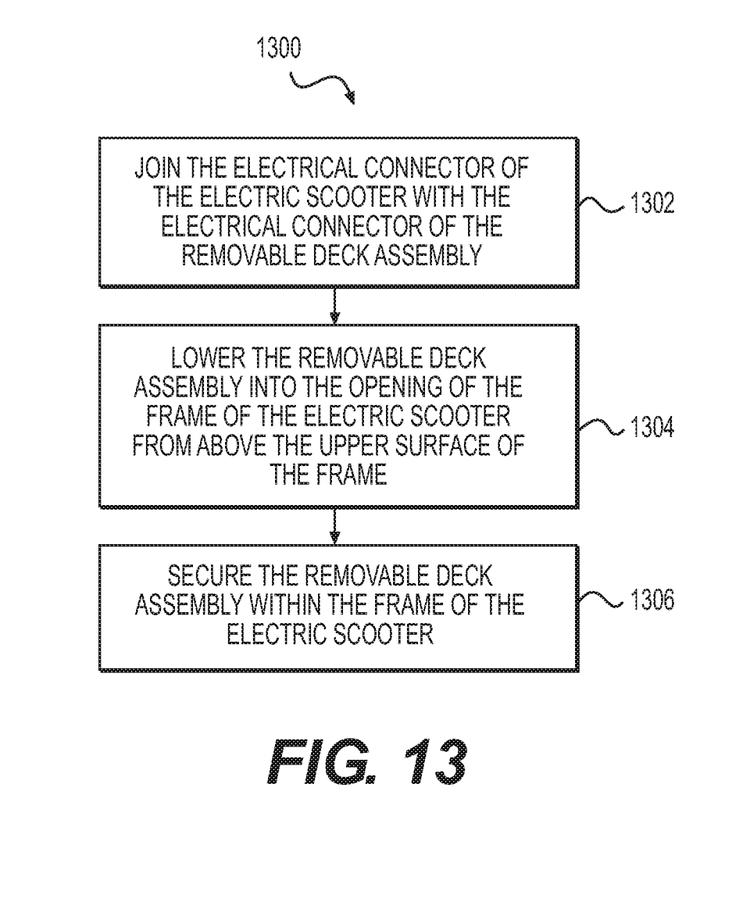
FIG. 13 illustrates a process for a user to install a removable deck assembly into an electric scooter according to embodiments of the disclosed technology.

FIG. 13 illustrates a process 1300 for a user to install a removable deck assembly into an electric scooter according to embodiments of the disclosed technology. While elements of the process 1300 are described in a particular sequence, it should be understood that certain elements of the process 1300 may be performed in other sequences, may be performed concurrently, may be omitted, or any combination thereof.

Referring to FIG. 13, the user may join the electrical connector of the electric scooter with the electrical connector of the removable deck assembly, at 1302. The connectors may be joined as described above. The user may lower the removable deck assembly into the opening of the frame of the electric scooter from above the upper surface of the frame, at 1304, for example as described above. The user may secure the removable deck assembly within the frame of the electric scooter, at 1306, for example as described above.

Figure 14:
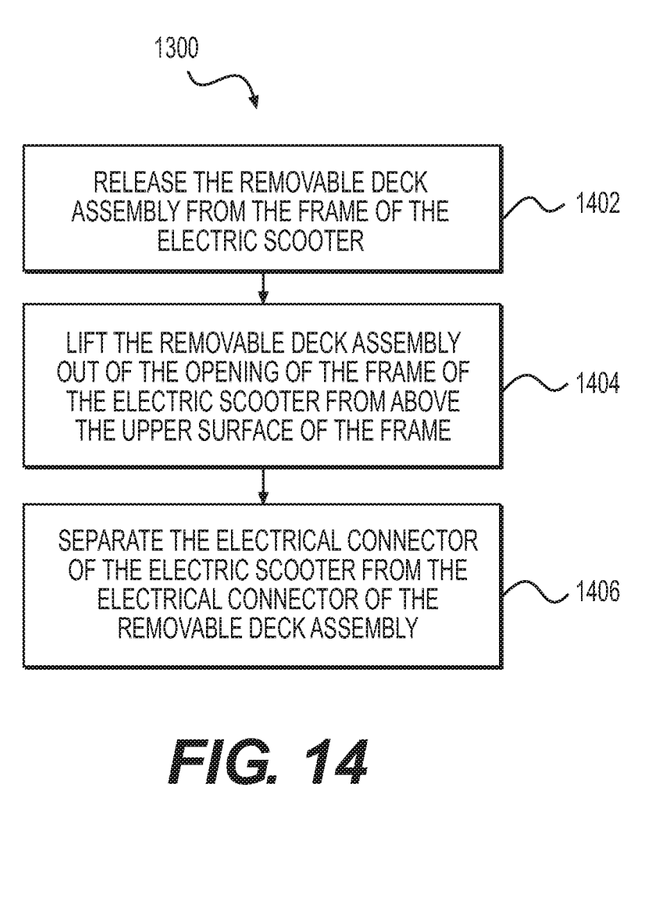
FIG. 14 illustrates a process for a user to remove a removable deck assembly from an electric scooter according to embodiments of the disclosed technology.

FIG. 14 illustrates a process 1400 for a user to remove a removable deck assembly from an electric scooter according to embodiments of the disclosed technology. While elements of the process 1400 are described in a particular sequence, it should be understood that certain elements of the process 1400 may be performed in other sequences, may be performed concurrently, may be omitted, or any combination thereof.

Referring to FIG. 14, the user may release the removable deck assembly from the frame of the electric scooter, at 1402, for example as described above. The user may lift the removable deck assembly out of the opening of the frame of the electric scooter from above the upper surface of the frame, at 1404, for example as described above. The user may separate the electrical connector of the electric scooter from the electrical connector of the removable deck assembly, at 1406 for example as described above. Spatially relative terms such as "under," "below," "lower," "over," "upper," and the like, are used for ease of description to explain the positioning of one element relative to a second element. These terms are intended to encompass different orientations of the device in addition to different orientations than those depicted in the figures. Further, terms such as "first," "second," and the like, are also used to describe various elements, regions, sections, etc. and are also not intended to be limiting. Like terms refer to like elements throughout the description.

As used herein, the terms "having," "containing," "including," "comprising," and the like are open ended terms that indicate the presence of stated elements or features, but do not preclude additional elements or features. The articles "a," "an" and "the" are intended to include the plural as well as the singular, unless the context clearly indicates otherwise.

Although this invention has been disclosed in the context of certain implementations and examples, it will be understood by those skilled in the art that the present invention extends beyond the specifically disclosed implementations to other alternative implementations and/or uses of the invention and obvious modifications and equivalents thereof. Thus, it is intended that the scope of the present invention herein disclosed should not be limited by the particular disclosed implementations described above.

Furthermore, the skilled artisan will recognize the interchangeability of various features from different implementations. In addition to the variations described herein, other known equivalents for each feature can be mixed and matched by one of ordinary skill in this art to construct analogous systems and techniques in accordance with principles of the present invention.

It is to be understood that not necessarily all objects or advantages may be achieved in accordance with any particular implementation of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

What is claimed is:

1. An electric scooter, comprising: a frame having an opening; a removable deck assembly disposed in the opening, the removable deck assembly comprising: a deck having an upper surface and a lower surface, a battery pack attached to the lower surface of the deck; an electric motor; and a first electrical connector, wherein the first electrical connector is electrically coupled to the electric motor; wherein the removable deck assembly comprises a second electrical connector, wherein the second electrical connector is electrically coupled to the battery pack; and wherein when joined together, the first and second electrical connectors electrically couple the electric motor and the battery pack; wherein the first and second electrical connectors are configured to retain each other, or release each other, by twisting the first and second electrical connectors in opposite directions.

2. The electric scooter of claim 1, wherein:
the frame has an upper surface; and
the removable deck assembly is configured to be lifted out of the opening of the frame from above the upper surface of the frame, and is configured to be lowered into the opening of the frame from above the upper surface of the frame.

3. The electric scooter of claim 1, further comprising: a first flexible electrical cable electrically coupled to the first electrical connector, and electrically coupled to the electric motor; and a second flexible electrical cable electrically coupled to the second electrical connector, and electrically coupled to the battery pack.

4. The electric scooter of claim 1, wherein the first and second electrical connectors become electrically coupled when the removable deck assembly is lowered into the opening of the frame.

5. The electric scooter of claim 1, further comprising:
at least one elastic mounting block disposed between the removable deck assembly and the frame, wherein at least one of the first and second electrical connectors is disposed within the at least one elastic mounting block.

6. The electric scooter of claim 1, further comprising:
a latch configured to secure the removable deck assembly within the opening of the frame when the latch is in a closed position, and configured to release the removable deck assembly from the opening of the frame when the latch is in an open position.

7. The electric scooter of claim 1, further comprising:
a lock operable to fix the latch in at least one of the open position and the closed position.

8. An electric scooter, comprising: a frame; a plurality of wheels coupled to the frame; an electric motor coupled to at least one of the wheels; wherein the frame comprises an opening configured to receive a removable deck assembly, wherein the removable deck assembly comprises: a deck having an upper surface and a lower surface, and a battery pack attached to the lower surface of the deck; a first electrical connector, wherein the first electrical connector is electrically coupled to the electric motor, and wherein first electrical connector is configured to electrically couple with a second electrical connector of the removable deck assembly; wherein the first and second electrical connectors are configured to retain each other, or release each other, by twisting the first and second electrical connectors in opposite directions.

9. The electric scooter of claim 8, wherein:
the frame has an upper surface; and
the opening in the frame is configured to receive the removable deck assembly when the removable deck assembly is lowered into the opening of the frame from above the upper surface of the frame.

10. The electric scooter of claim 8, wherein the first and second electrical connectors become electrically coupled when the removable deck assembly is lowered into the opening of the frame.

11. The electric scooter of claim 8, further comprising:
a latch configured to secure the removable deck assembly within the opening of the frame when the latch is in a closed position, and configured to release the removable deck assembly from the opening of the frame when the latch is in an open position.

12. A removable deck assembly for an electric scooter, the removable deck assembly comprising: a deck having an upper surface and a lower surface; and a battery pack attached to the lower surface of the deck; a first electrical connector, wherein the first electrical connector is electrically coupled to the battery pack, and wherein first electrical connector is configured to electrically couple with a second electrical connector of the electric scooter; wherein the first and second electrical connectors are configured to retain each other, or release each other, by twisting the first and second electrical connectors in opposite directions.

13. The removable deck assembly of claim 12, wherein the removable deck assembly is configured to be lowered into an opening of a frame of the electric scooter from above an upper surface of the frame.

14. The removable deck assembly of claim 12, wherein the first and second electrical connectors become electrically coupled when the removable deck assembly is lowered into an opening of the frame of the electric scooter.

* * * * *